United States Patent [19]
Kim

[11] Patent Number: 5,327,175
[45] Date of Patent: Jul. 5, 1994

[54] CIRCUIT FOR DETECTING ODD AND EVEN FIELDS OF A VIDEO SIGNAL
[75] Inventor: Hak-Seong Kim, Seoul, Rep. of Korea
[73] Assignee: Samsung Electronics Co., Ltd., Kyungki, Rep. of Korea
[21] Appl. No.: 998,726
[22] Filed: Dec. 30, 1992
[30] Foreign Application Priority Data
Dec. 31, 1991 [KR] Rep. of Korea .................. 25679
[51] Int. Cl.⁵ .............................................. H04N 5/08
[52] U.S. Cl. ................................................... 348/526
[58] Field of Search ............... 358/148, 153, 154, 150, 358/139; H04N 5/06, 5/04

[56] References Cited
U.S. PATENT DOCUMENTS
4,683,495 7/1987 Brock ..................... 358/148
5,025,496 6/1991 Canfield ..................... 358/153

FOREIGN PATENT DOCUMENTS
0014258 1/1982 Japan .................. H04N 5/08
0037977 4/1982 Japan .................. H04N 5/08

Primary Examiner—Victor R. Kostak
Assistant Examiner—Nathan J. Flynn
Attorney, Agent, or Firm—Sughrue, Mion, Zinn, Macpeak & Seas

[57] ABSTRACT

A circuit for detecting odd and even numbered fields of a video signal includes a first counter circuit for counting a clock pulse input to detect a vertical synchronous pulse interval of the video signal, a second counter circuit for counting the clock pulse upon detection of the vertical synchronous pulse interval to generate a window signal and a counting signal having a predetermined pulse width, and an output circuit responsive to horizontal synchronous pulses and the window signal to generate a first logic state remaining for a next vertical synchronous pulse interval or generate a second logic state remaining for the next vertical synchronous pulse interval, whereby the output circuit maintains the first logic state for the odd field and the second logic state for the even field.

5 Claims, 2 Drawing Sheets

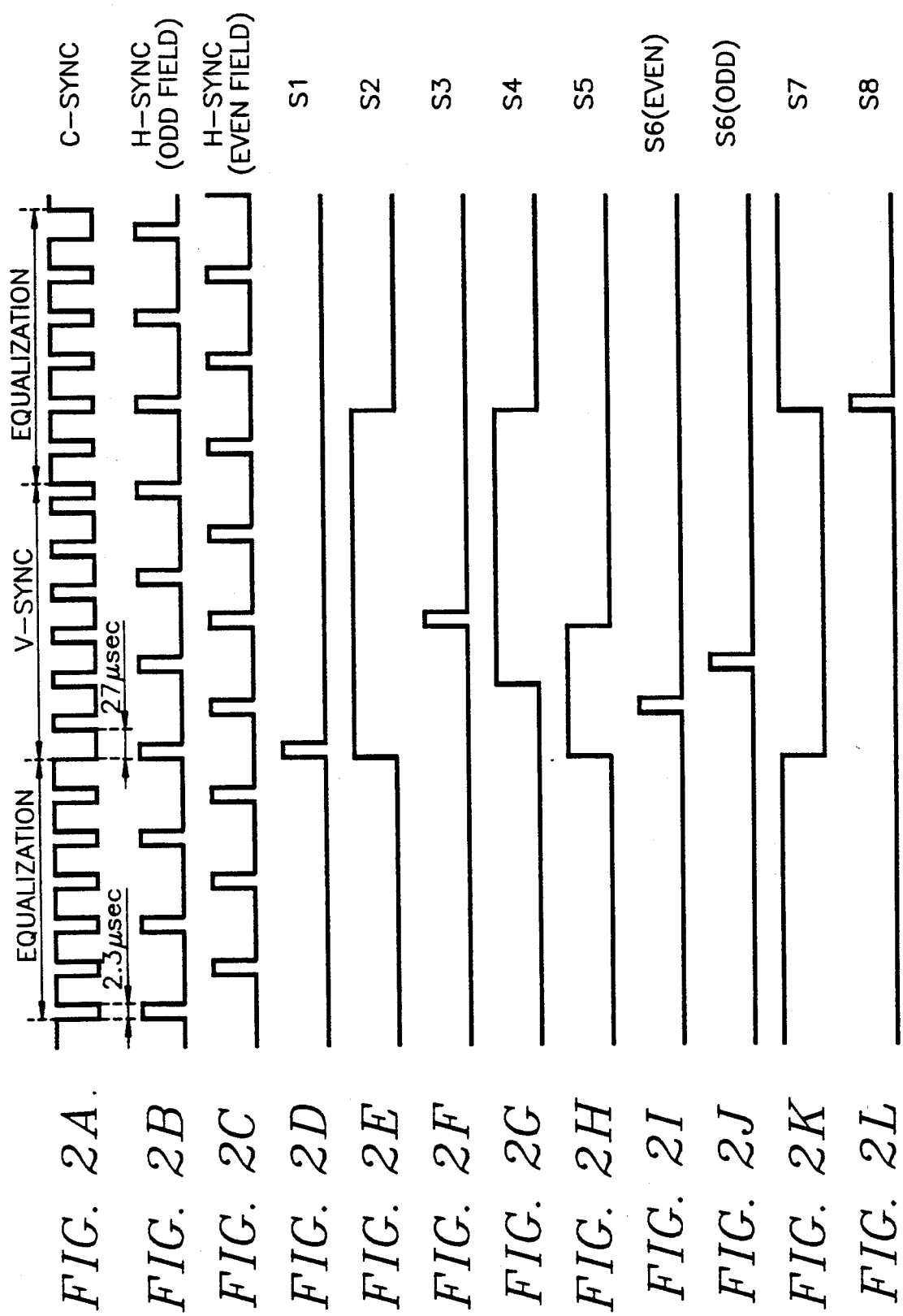

CIRCUIT FOR DETECTING ODD AND EVEN FIELDS OF A VIDEO SIGNAL

BACKGROUND OF THE INVENTION

The present invention relates to video signal processing and more particularly to a circuit for detecting odd and even numbered fields of a video signal.

Conventionally, a detection of odd and even numbered fields of a video signal is achieved by means of a software program. In this case, it is general to employ a microcomputer and additional peripheral devices to control the field detection. However, the software program is apt to cause a program bug occasionally. Further, whenever the program bug occurs the software program must be reset to restart the program. Thus, the reliability of the field detection of a video signal becomes lowered.

SUMMARY OF THE INVENTION

It is therefore an object of the present invention to provide a circuit for detecting odd and even numbered fields of a video signal by means of a hardware.

According to the present invention, a circuit for detecting odd and even numbered fields of a video signal includes a first counter circuit for counting a clock pulse input to detect a vertical synchronous pulse interval of the video signal, a second counter circuit for counting the clock pulse upon detection of the vertical synchronous pulse interval to generate a window signal and a counting signal having a predetermined pulse width, and an output circuit responsive to horizontal synchronous pulses and the window signal to generate a first logic state remaining for a next vertical synchronous pulse interval or generate a second logic state remaining for the next vertical synchronous pulse interval, whereby the output circuit maintains the first logic state for the odd field and the second logic state for the even field.

The present invention will now be described in more detail with reference to the drawings attached only by way of example.

BRIEF DESCRIPTION OF THE ATTACHED DRAWINGS

FIG. 1 shows a circuit for detecting odd and even fields of a video signal according to the present invention; and FIGS. 2A-2L show waveforms of the respective sections of FIG. 1.

DETAILED DESCRIPTION OF A CERTAIN PREFERRED EMBODIMENT

Figure 1:
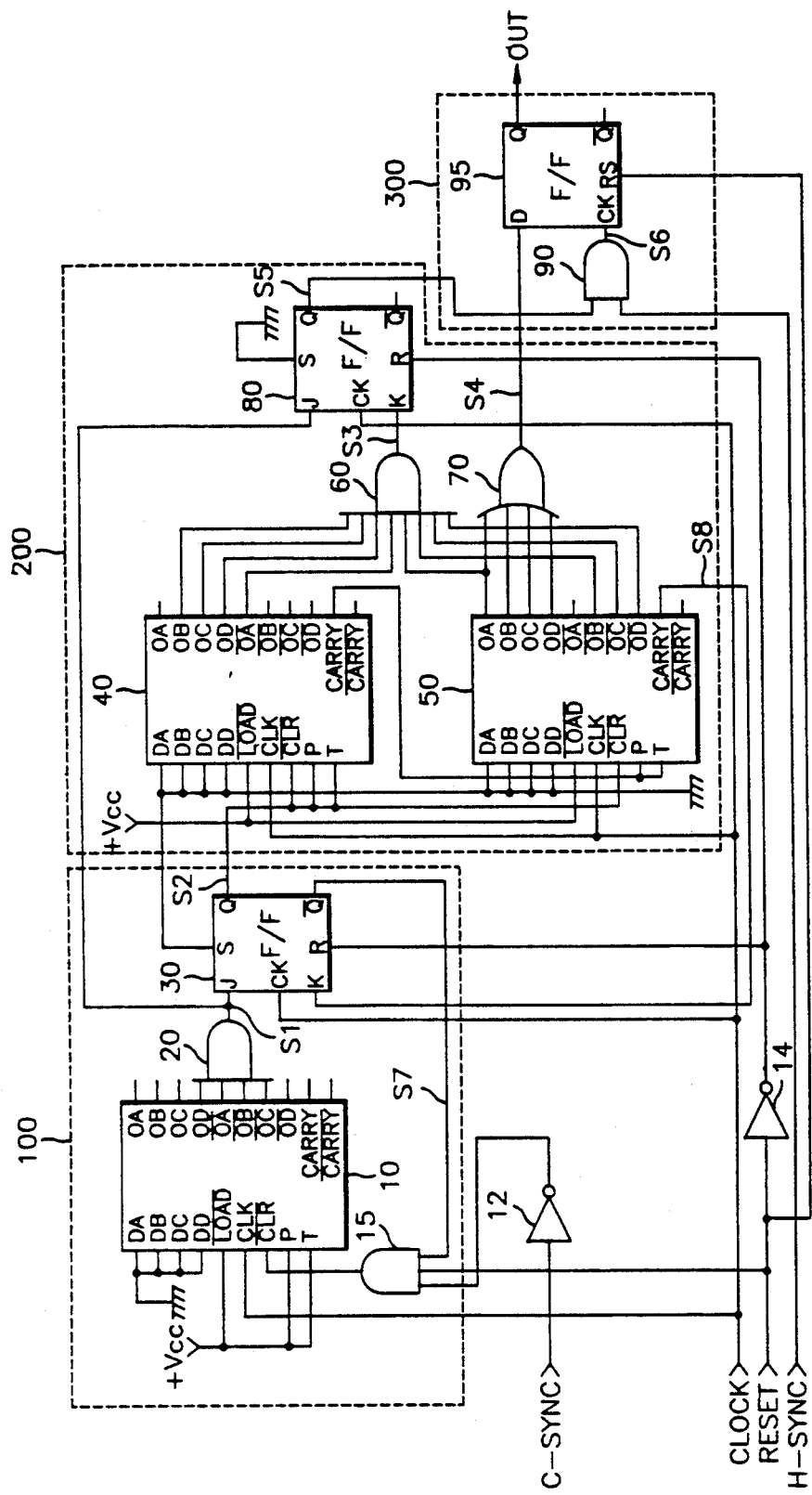

Referring to FIG. 1, a first counter circuit 100 includes a first AND gate 15, a synchronous counter 10, a second AND gate 20 and a JK flip-flop 30. The first AND gate 15 receives composite synchronous pulses from a composite synchronous pulse generator (not shown) via an inverter 12 and a reset pulse from a reset circuit (not shown). The second AND gate 20 receives the outputs of the synchronous counter 10 to detect therefrom a starting point of a vertical synchronous pulse interval (see FIG. 2D).

A second counter circuit 200 includes first and second 4-bit synchronous counters 40, 50 connected in parallel to form an 8-bit counter, a third AND gate 60, an OR gate 70 and a JK flip-flop 80. The 8-bit counter receives the output S2 (FIG. 2E) of the first counter circuit 100 and the output pulses from the clock pulse generator and the reset circuit, so as to generate a window signal S5 (FIG. 2H) covering the even- and odd-field horizontal synchronous pulses S6 (FIGS. 2I and 2J) which are first received after the beginning of the vertical synchronous pulse interval. Further, the OR gate 70 receives the outputs of the second 4-bit synchronous counter 50 to generate an output S4 (FIG. 2G) which goes to the logic "high" when the second synchronous counter 50 counts at least 16-clock pulses.

A field detection circuit 300 includes a fourth AND gate 90 and a D flip-flop 95. The field detection circuit 300 receives the signals S4 and S5 from the second horizontal counter circuit 200 and the horizontal synchronous pulses S6 (FIGS. 2I and 2J), so as to generate odd and even field signals through an output terminal OUT.

It should be noted that the circuit of FIG. 1 according to the present invention employs the clock pulses having a frequency of 500 KHz (i.e., a period of $2\mu\text{sec}$). Further, the composite synchronous pulses of FIG. 2A has an equalization pulse interval and a vertical synchronous pulse interval. For the equalization pulse interval, the logic "low" states of the pulses continue to remain for about 2.3 $\mu\text{sec}$. However, for the vertical synchronous pulse interval, the logic "low" states of the pulses continue to remain for about 27 $\mu\text{sec}$.

Operation of the circuit according to the present invention will now be described hereinafter with reference to FIGS. 1 and 2A-2L.

First of all, the synchronous counter 10 counts the clock pulses having a period of 2 $\mu\text{sec}$ in association with the composite synchronous pulses and the reset pulse received through the first AND gate 15. If the synchronous counter 10 counts 8-clock pulses (i.e., 16 $\mu\text{sec}$), the second AND gate 20 generates an output signal S1 of the logic "high".

However, since for the equalization pulse interval, the logic "low" states of the pulses remain for about 2.3 $\mu\text{sec}$, the synchronous counter 10 may be cleared prior to counting 8-clock pulses, in response to the logic "high" state of the composite synchronous pulses which are applied to the first AND gate 15 via the inverter 12, so that the output signal S2 of the JK flip-flop 30 may not go to the logic "high" during the equalization pulse interval. Otherwise, however, the synchronous counter 10 may count maximum 14-clock pulses (i.e., 28 $\mu\text{sec}$) during the vertical synchronous pulse interval where the duration of the logic "low" state is about 27 $\mu\text{sec}$. Therefore, the first counter circuit 100 has a sufficient time margin to count 8-clock pulses (16 $\mu\text{sec}$) for the vertical synchronous pulse interval, so as to detect the vertical synchronous pulse interval. Accordingly, upon counting 8-clock pulses in the vertical synchronous pulse interval, the synchronous counter 10 allows the JK flip-flop 30 to generate the logic "high" at the output "Q". At the same moment, the synchronous counter 10 is cleared by the logic "low" at the inverse output "/Q" of the JK flip-flop 30 and continues to allow the JK flip-flop 30 to maintain the logic "high" state, ignoring the next six vertical synchronous pulses.

In the meantime, the 8-bit counter starts to operate since the output S2 of the JK flip-flop 30 is at the logic "high". Then, the clock pulses are counted by the 8-bit counter (40, 50) until either of the next horizontal synchronous pulses for the odd or even fields (FIGS. 2B and 2C) is detected so as to generate the signals S3 and S4.

Further, the signal S3 from the third AND gate 60 goes to the logic "high" when the 8-bit counter counts 30-clock pulses, i.e., 60 μsec. Then, the window signal S5 which became the logic "high" by the signal S1 of the logic "high" from the first AND gate 20, goes to the logic "low" by the signal S3 of the logic "high" from the third AND gate 60 to form the window signal S5 remaining for 60 μsec (the time required for counting 30-clock pulses). The horizontal synchronous pulse input is transmitted to the D flip-flop as a clock pulse via the fourth AND gate 90 only when the window signal S5 from the JK flip-flop 80 is at the logic "high". Therefore, the signals S6 (FIGS. 2I and 2J) from the fourth AND gate 90 clocks the D flip-flop 95 to generate the odd or even field signal according to the signal S4.

In case of the even field, the D flip-flop 95 is clocked by the signal S6 (FIG. 2I) output from the fourth AND gate 90 which goes to the logic "high" about 15 μsec (the time required for counting 7 or 8 clock-pulses) after the beginning of the widow signal S5 (FIGS. 2H and 2I). At this moment, the signal S4 (FIG. 2G) output from the OR gate 70 is at the logic "low" because the upper four bits of the 8-bit counter are all at the logic "low". Thus, the D flip-flop 95 continues to maintain the logic "low" state until the next vertical synchronous pulse interval is detected.

Meanwhile, in case of the odd field, the D flip-flop is clocked by the signal S6 (FIG. 2J) output from the fourth AND gate 90 which goes to the logic "high" about 46 μsec (the time for counting 23-clock pulses) after the beginning of the window signal S5 (FIGS. 2H and 2J). At this moment, the signal S4 (FIG. 2G) output from the OR gate 70 is at the logic "high" because at least one of the upper four bits of the 8-bit counter (40, 50) is at the logic "high". Thus, the D flip-flop 95 continues to maintain the logic "high" state until the next vertical synchronous pulse interval is detected.

In conclusion, the D flip-flop 95 generates at the output Q (OUT) the logic "low" for the even field and the logic "high" for the odd field.

In light of the forgoing disclosure, it may be readily appreciated that the circuit according to the present invention can detect the odd and even fields of a video signal by means of a hardware, thus improving the reliability of the field detection.

What is claimed is:

1. A circuit for detecting odd and even fields of a video signal input, comprising:
    first counter means for counting a clock pulse input to detect a vertical synchronous pulse interval of the video signal;
    second counter means for counting the clock pulse upon detection of the vertical synchronous pulse interval to generate a window signal and a counting signal having a predetermined pulse width; and
    output means for, in response to horizontal synchronous pulses and the window signal, generating a first logic state remaining for a next vertical synchronous pulse interval, and for generating a second logic state remaining for the next vertical synchronous pulse interval;
whereby the output means maintains the first logic state for the odd field and the second logic state for the even field.

2. The circuit as claimed in claim 1, wherein said first counter means comprises:
    a first AND gate for receiving composite synchronous pulses and a reset pulse;
    a synchronous counter, coupled to receive an output of said first AND gate, and for counting the clock pulse;
    a second AND gate for receiving the output of the synchronous counter to detect therefrom the vertical synchronous pulse interval; and
    a first JK flip-flop responsive to the output of the second AND gate.

3. The circuit as claimed in claim 1, wherein said second counter means comprises:
    first and second 4-bit synchronous counters connected in parallel to form an 8-bit counter, for counting the clock pulse upon receiving the output of a first JK flip-flop;
    an AND gate for receiving the output of the 8-bit synchronous center;
    an OR gate for receiving the output of the second 4-bit synchronous counter to generate the counting signal; and
    a second JK flip-flop for receiving the outputs of the second and third AND gates to generate the window signal.

4. The circuit as claimed in claim 1, wherein said output means comprises:
    a fourth AND gate for receiving the window signal and the vertical synchronous pulses to generate a subclock pulse; and
    a D flip-flop for receiving the counting signal to maintain the logic state of the counting signal in response to the subclock pulse.

5. The circuit as claimed in claim 2, wherein said second counter means comprises:
    first and second 4-bit synchronous counters connected in parallel to form a 8-bit counter, for counting the clock pulse upon receiving the output of the first JK flip-flop;
    a third AND gate for receiving the output of the 8-bit synchronous counter;
    an OR gate for receiving the output of the second 4-bit synchronous counter to generate the counting signal; and
    a second JK flip-flop for receiving the outputs of the second and third AND gates to generate the window signal.

* * * * *